United States Patent
Locatelli et al.

(10) Patent No.: US 10,846,439 B2
(45) Date of Patent: Nov. 24, 2020

(54) FUNCTIONAL SAFETY OVER TRACE-AND-DEBUG

(71) Applicant: Intel Corporation, Santa Clara, CA (US)

(72) Inventors: Riccardo Locatelli, Santa Clara, CA (US); Peter Lachner, Heroldstatt (DE); Riccardo Mariani, Pisa (IT); Michael Paulitsch, Ottobrunn (DE); Kevin Safford, Fort Collins, CO (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/457,748

(22) Filed: Jun. 28, 2019

(65) Prior Publication Data

US 2019/0370503 A1    Dec. 5, 2019

(51) Int. Cl.
  *G06F 21/75*    (2013.01)
  *G01R 31/319*    (2006.01)

(52) U.S. Cl.
  CPC .......... *G06F 21/75* (2013.01); *G01R 31/319* (2013.01)

(58) Field of Classification Search
  None
  See application file for complete search history.

(56) References Cited

U.S. PATENT DOCUMENTS

2015/0254461 A1* 9/2015 Leconte ................. G06F 21/57
                                                         726/25
2017/0228279 A1* 8/2017 Mariani ................ G06F 11/008

* cited by examiner

*Primary Examiner* — Seokjin Kim
(74) *Attorney, Agent, or Firm* — Schwegman Lundberg & Woessner, P.A.

(57) ABSTRACT

A system to evaluate functional safety in an integrated circuit. The system includes a first circuit to execute an operation to cause to system to perform a function, where the function associated with a specified safety integrity level. The system also includes second circuit to capture trace data at an interface to the first circuit or at internal signals without inhibiting performance of the function, where the trace data comprising information that is used to determine whether the system can perform the function with an indicated level of functional safety and transmit the trace data to a safety evaluation circuit.

25 Claims, 6 Drawing Sheets

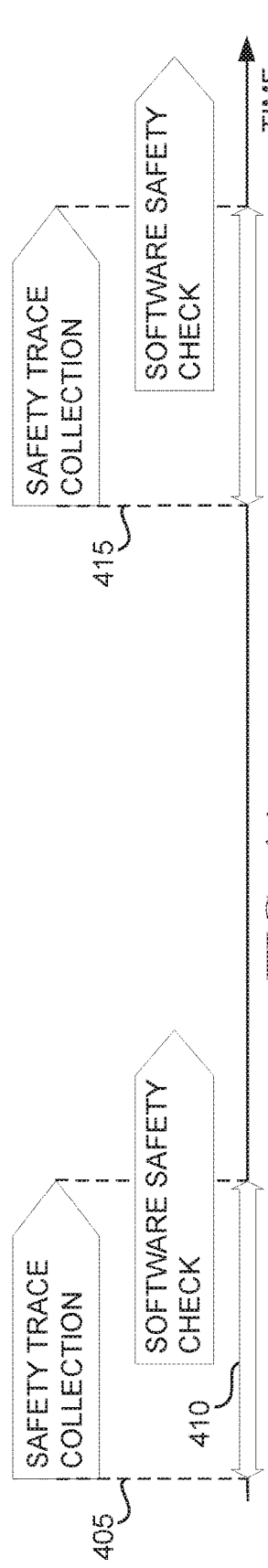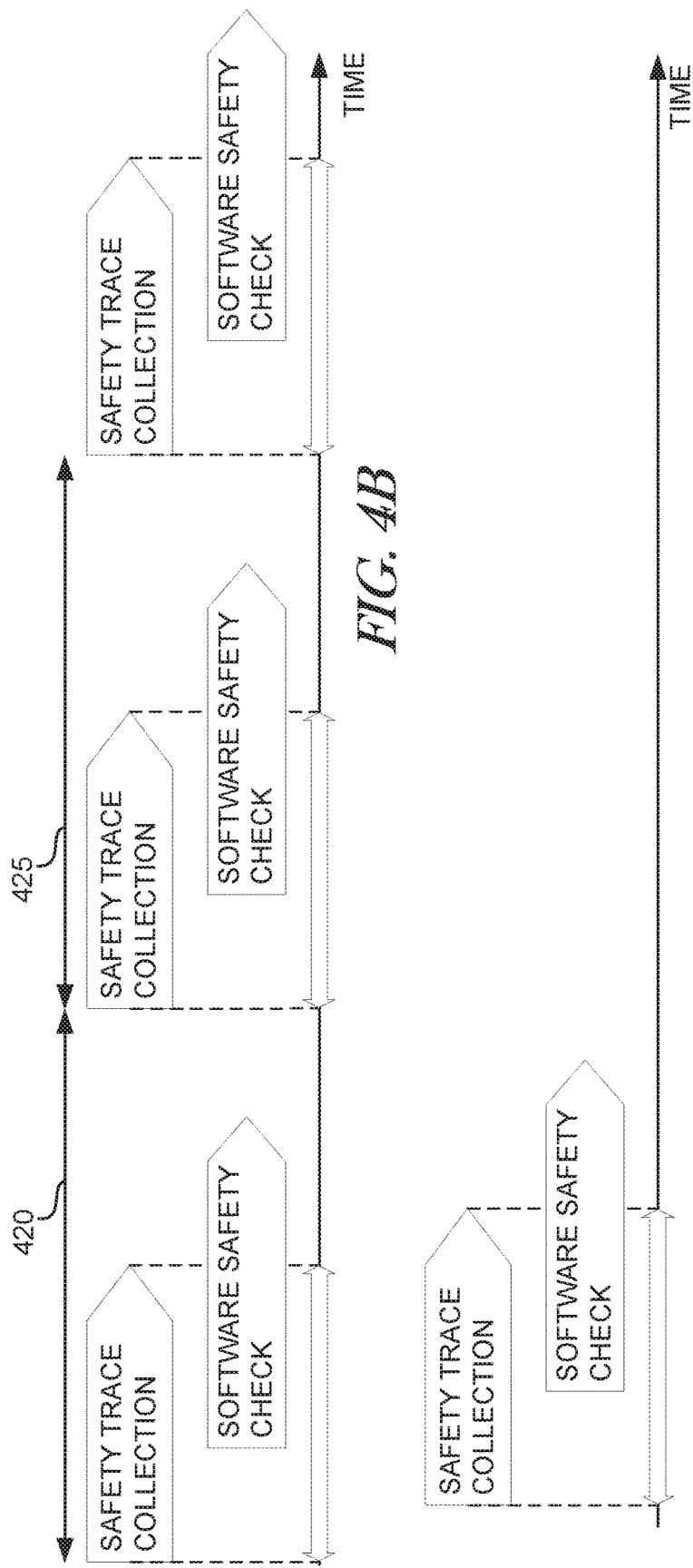
FIG. 4A
FIG. 4B
FIG. 4C

FUNCTIONAL SAFETY OVER TRACE-AND-DEBUG

TECHNICAL FIELD

Embodiments described herein generally relate to electronic circuits, and in particular, to techniques for enabling functional safety of integrated circuit.

BACKGROUND

Automotive, industrial, manufacturing, and other industries that use or produce systems whose operation potentially risks injury to life or property are increasingly adopting standardized safety techniques for designing and testing such system. Such standardized techniques can include the implementation of functional safety standards, such as through the integration of safety functions into a system to ensure that the system operates correctly in response to inputs, operator errors, hardware or software failures, or changes in the operating environment. Such standardized techniques can also include the implementation of functional safety standards to detect cases where unsafe operation of a system may occur and to additional action may be taken. Such safety functions can depend on, and may require insights into, the operation of each component of such systems. Examples of functional safety standards include International Electrotechnical Commission standard IEC 61508 for electrical/electronic/programmable electronic safety-related systems, and International Organization for Standardization ISO 26262 for functional safety for road vehicles.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 4A depicts a timing diagram for trigging hardware trace collection based on an occurrence of an event, according to an embodiment;

FIG. 4B depicts a timing diagram for periodically trigging hardware trace collection, according to an embodiment;

FIG. 4C depicts a timing diagram for trigging hardware trace collection based on an occurrence of a startup event, according to an embodiment;

DETAILED DESCRIPTION

Figure 1:
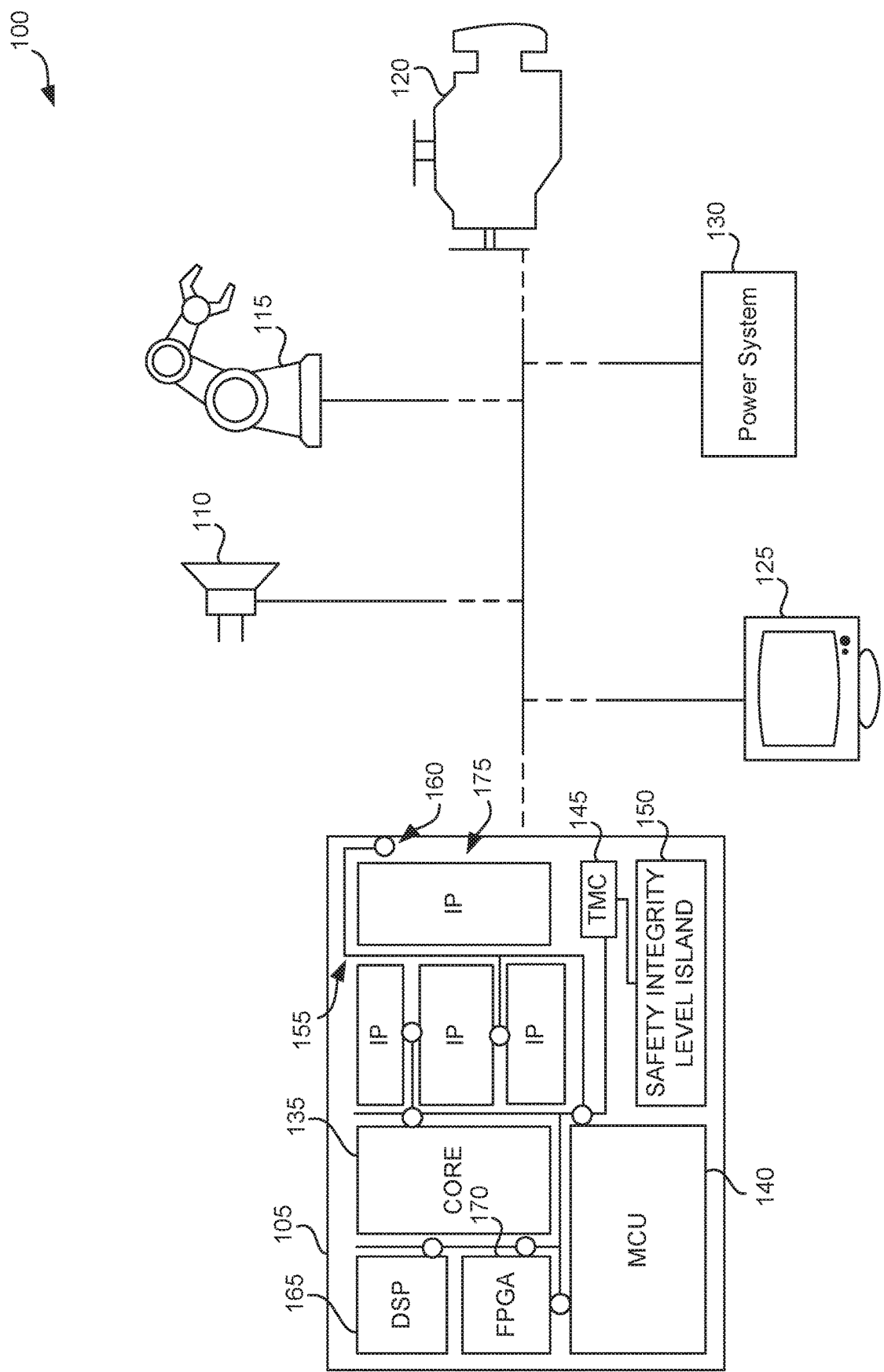
FIG. 1 is a block diagram illustrating a system incorporating a tracing infrastructure for functional safety over trace and debug, according to an embodiment.

In the following description, for purposes of explanation, numerous specific details are set forth in order to provide a thorough understanding of some example embodiments. It will be evident, however, to one skilled in the art that the present disclosure may be practiced without these specific details.

Integrated circuit devices are common component of systems that are used or produced in modern automotive, industrial, or manufacturing industries. These electronic devices can operate as the control center of these systems, such as by controlling or implementing the decision making, notification, actuation, and power control functions of such systems. Consequentially, the design and testing of these systems to meet functional safety standards can depend on the implementation of safety functions that require exposure to data that is indicative of the internal operation these integrated circuit devices.

Some systems are controlled by complex multi-segment integrated circuits, such as systems on chip (SoC) devices, that incorporate one or more disparate processing cores or application specific intellectual property elements. Configuring these complex integrated circuits to support functional safety can include either embedding dedicated hardware safety features in these devices or using software techniques to implement safety check functionality. Integrating hardware safety features into a complex multi-segment IC can provide the best coverage of the device functionality, but such techniques can have high design costs that may be unjustifiable in view of that fact many of these devices are manufactured for, or used in, markets that do not adhere to functional safety standards. Implementing functional safety in these devices using software techniques can enable the implementation of complex, or high level, functional safety checks while avoiding the issue of unjustifiable hardware design costs. The cost of developing the software libraries and other tools used to implement such software techniques can be high, while the diagnostic coverage provided by these techniques can be limited and difficult to measure due to the complexity of the software needed to access useful hardware information from these devices.

Embodiments of the present disclosure are based on the realization that the hardware trace and debug infrastructure of some SoC devices can be leveraged to capture, or generate, trace data (e.g., software or firmware trace data that captures information about the execution of software or firmware application, or hardware trace data generated by using hardware circuits to probe or capture signals or device interfaces) that can provide functional safety related insight into the operation of internal components of these devices. Such functional safety information can be used by software-based functional safety mechanisms to validate the operation of SoC devices against specified functional safety standards.

According to the techniques (e.g., circuits, systems, and processes) described herein, an SoC device can include a collection one or more processing cores, microcontroller units, or other application or user specific intellectual property elements that are functionally coupled together by one or more communication bus or interconnect fabric to execute user defined operations of the SoC, such as prescribed in a software application. The SoC device can also include a hardware trace infrastructure that is enhanced to capture functional safety related data (e.g., safety-related hardware, firmware, or software traces) during operation of the SoC device. Examples of hardware trace infrastructure can include Intel® Process Trace or Trace Hub, or other circuits that implement branch trace or instruction trace techniques. Such circuits can capture trace data during operation of an SoC device without interfering with, or inhibiting, the operation of the device. Such trade data can include hardware trace data, such as device level information (e.g., temperature, device register values such as error counts, instruction address, or memory address). Such trace data can also include firmware trace data generated by SoC device block programmable code. Such trace data can also include software trace data generated tracing instructions inserted into the source code, to capture safety relevant data. The hardware trace infrastructure can be enhanced, such as through software or by modifications to physical circuits of the hardware trace infrastructure, to capture functional safety-related traces (e.g., hardware, software, or firmware traces) from one or more elements of the SoC device.

In some embodiments, an SoC device can include a dedicated function safety processing element, such as a safety integrity level island (SILI) that is integrated into the SoC is programmed with one or more safety check algorithms to use the safety-related traces to evaluate the functional safety of the SoC device or a system that incorporate the SoC device. Such SILI can include a processing circuit, such as a microcontroller unit (MCU) that is configured to establish strong safety development assurance claims due to its rigorous design and development process. In other embodiments, the hardware trace infrastructure can be configured to transmit, such as through a trace port, the safety trace data to a computing device that is external to the SoC to perform the safety monitoring functions.

The techniques described herein realize advantages over other techniques for implementing functional safety in integrated circuits, such as by combining software techniques for validating a device against a functional safety standard with an improved hardware technique for capturing functional safety related information from internal elements of the integrated circuits. More specifically, by adapting existing hardware tracing infrastructure to capture functional safety data, the techniques described herein enables complex multi-segment SoCs to support functional safety standards without incurring the costs of redesigning these devices to support specific functional safety features.

The techniques described herein enable the implementation of functional safety standards without substantially limiting performance of a system. More specifically, the performance penalty for executing functional safety software in an SoC device can be small since both the functional safety processing element and the hardware trace infrastructure for collecting safety-related hardware traces are implemented using dedicated hardware resources that have a small or controlled effect on the resources that are used to execute user applications.

Additionally, by using a combination of software (or firmware) instrumentation and hardware techniques to capture functional safety information about executing applications and implementing functional safety semantic checks in software, the techniques described herein can implement complex or abstract functional safety solutions, such as software comparison of two copies of the application running on processing cores. Furthermore, these techniques can economically implement different functional safety standards with different safety integrity levels. These advantages and others are described further herein.

FIG. 1 is a block diagram illustrating a system 100 incorporating a tracing infrastructure for functional safety over trace and debug, according to an embodiment. The system 100 can be any electrical, electronic, or programmable electronic system that incorporates an electronic control unit 105 and one or more electronically actuatable devices or systems, such as an audio alerting system 110, an industrial control system 115, a powertrain control system 120, a notification system 125, or a power system 130. The system 100 can be configured to perform any control or notification function (hereinafter, "system function") that can be specified in any set of one or more operations that are executable by the control unit 105, such as to control the actuation of an electrically actuatable device or system. Such control can include initiating, terminating, or adjusting the actuation of such devices or systems.

In some embodiments, the system 100 can be instrumented with one or more safety functions that are configured to cause the system to execute an indicated system function according to an indicated safety integrity level (SIL), such as by reducing any risks due to specific failure modes to a level prescribed by the SIL or associated functional safety standard. Such safety functions can receive data that is indicative of the operation of the system 100, analyze the data to determine whether the system 100 is in a state, or will imminently enter a state, that will prevent the system from being able to execute a system function according to indicated SIL. A safety function can provide a notification of the determination, such as to a system operation or user. In addition, or as an alternative, to providing the notification, a safety function can execute one or more operations to inhibit, enable, or adjust the operation of the system based on the determination. Generally, a safety function can be configured to perform its detection, notification, or regulation functions based on a SIL associated with a system function of the system 100. Such SIL can prescribed by a functional safety standard, such as the automotive safety integrity level defined in ISO 26262.

The control unit 105 can include any integrated circuit that is configurable, such as though programming with one or more software applications, to execute a control the execution of a system function of the system 100 according an indicated SIL. In an embodiment, the control unit 105 includes a multi-segment IC, such as an SoC device. As shown in FIG. 1, the control unit 105 can incorporate a one or more processing elements, such as processing core 135, microcontroller unit (MCU) 140, a digital signal processor (DSP) 165, reconfigurable circuits such as a field programmable gate array 170, or other user or manufacturer defined intellectual property (IP) elements 175. The core processing unit 135 or a microcontroller unit 140 (hereinafter, "processing units") can be coupled, such as by a computing bus or interconnect fabric (not shown), to one or more IP elements of the control unit 105, such as to communicate address, data, control signals, or other information between processing units and the IP elements. The control unit 105 incorporates a hardware trace infrastructure or subsystem, including a trace bus 155, one or more trace points 160, and a trace management controller (TMC) 145. In an embodiment, the control unit 105 incorporates a safety integrity level island (SILI) 150.

The core processing unit 135 or microcontroller unit 140 can be configured by one or more operations of a user or system software application to control the operation or execution of a system function of the system 100. Such operations can include operations to distribute data and instructions to, and to receive processed data from, one or more IP elements 175 of the control unit 105. An IP element 175 can receive data and instructions from, or may transmit processed data to, an interface to the system bus or interconnect fabric (hereinafter, "system interconnect").

The trace infrastructure can include a set of dedicated resources that operate independent of, or in parallel with, the resources used by the core processing unit 135 or microcontroller unit 140 to execute software applications. Such dedicated resources can include the trace bus 155, the one or more trace points 160, or the trace management controller (TMC) 145. The trace bus 155 can be a dedicated communication bus or interconnect fabric (hereinafter, "trace interconnect") that is distinct from the system interconnect. The trace points 160 can include dedicated circuits that are configurable to monitor an interface between an IP element 175 and the system interconnect. Such trace points can also be configured to monitor any internal IP signals generated by the IP element 175. Such monitoring can include capturing data in real time, such as during the execution of a software application, and communicating such data to the TMC 145 without substantially inhibiting or interfering with the execution of the software application.

The data captured by the trace infrastructure can include information that is indicative of the state of the operation any element of the control unit 105. In an embodiment, such captured data (e.g., trace data) includes internal signal values, or instruction addresses, data addresses, system interconnect utilization statistics, or any other raw (e.g., unprocessed) data that can be captured at an interface between the system interconnect fabric and the core processing unit 135, microcontroller unit 140, or an IP element 175. In another embodiment, such trace data can include a time stamp that is indicative of a time at which an element of the trace data was captured.

In some embodiments, a software application that is configured to execute on core processing unit 135 or microcontroller unit 140 can be instrumented with one or more trace instructions that cause these processing circuits, or any other another execution unit (e.g., DSP 165 or FPGA 170) or IP element 175, to explicitly move the values of variables or other software state information to the hardware trace infrastructure. In these embodiments, the trace data can include the values of such variable or such other software state information.

In an embodiment, the trace data include application-selected messages, such as audio chime messages crossing an interface, ad-hoc generated signatures, redundant software outputs, thread elaboration outputs, activation commands in specified IO interfaces, communication protocol signals, or read/write traffic crossing the system interconnect fabric.

The TMC 145 can be configured to receive trace data from one or more trace points 160 and transmit such data to one or more processing circuits or computing devices for processing or evaluation. In some embodiments, the TMC 145, a trace point 160, or an IP element interface can identify certain trace data as relevant to the functional safety of the system 100. Such safety-related traces can include any data this useful for performing a safety check or evaluating a safety function. The TMC 145 can transmit such safety-related traces to a dedicated functional safety evaluation or processing circuit, such as the SILI 150.

The safety integrity level island (SILI) 150 can include a processing element that is configured to execute one or more software applications that include algorithms or safety functions can evaluate whether operation of the system 100 meets a specified SIL. In an embodiment, the SILI 150 includes a processing element that is incorporated into the control unit 105. In another embodiment, the SILI 150 is an external computing device or processing element is coupled the control unit 105, such as though a hardware trace port, debug port, other interface. The SILI 150 can receive safety-related traces from TMC 145, use the traces to evaluate one or more safety functions, and perform an action based on the outcome of the evaluation. In an embodiment, such action includes providing a notification, such as by triggering an alarm or providing information that formatted for display on an electronic display or other graphical user interface. In another embodiment, such action includes inhibiting the operation of the system 100 or one or more elements of the control unit 105, such as when the evaluation of a safety function indicates that operation of the system 100 cannot meet a specified SIL. In another embodiment, such action includes enabling operation of the system 100 or one or more elements of the control unit 105, such as when evaluation of a safety function indicates that operation of the system 100 can meet a specified SIL.

Figure 2:
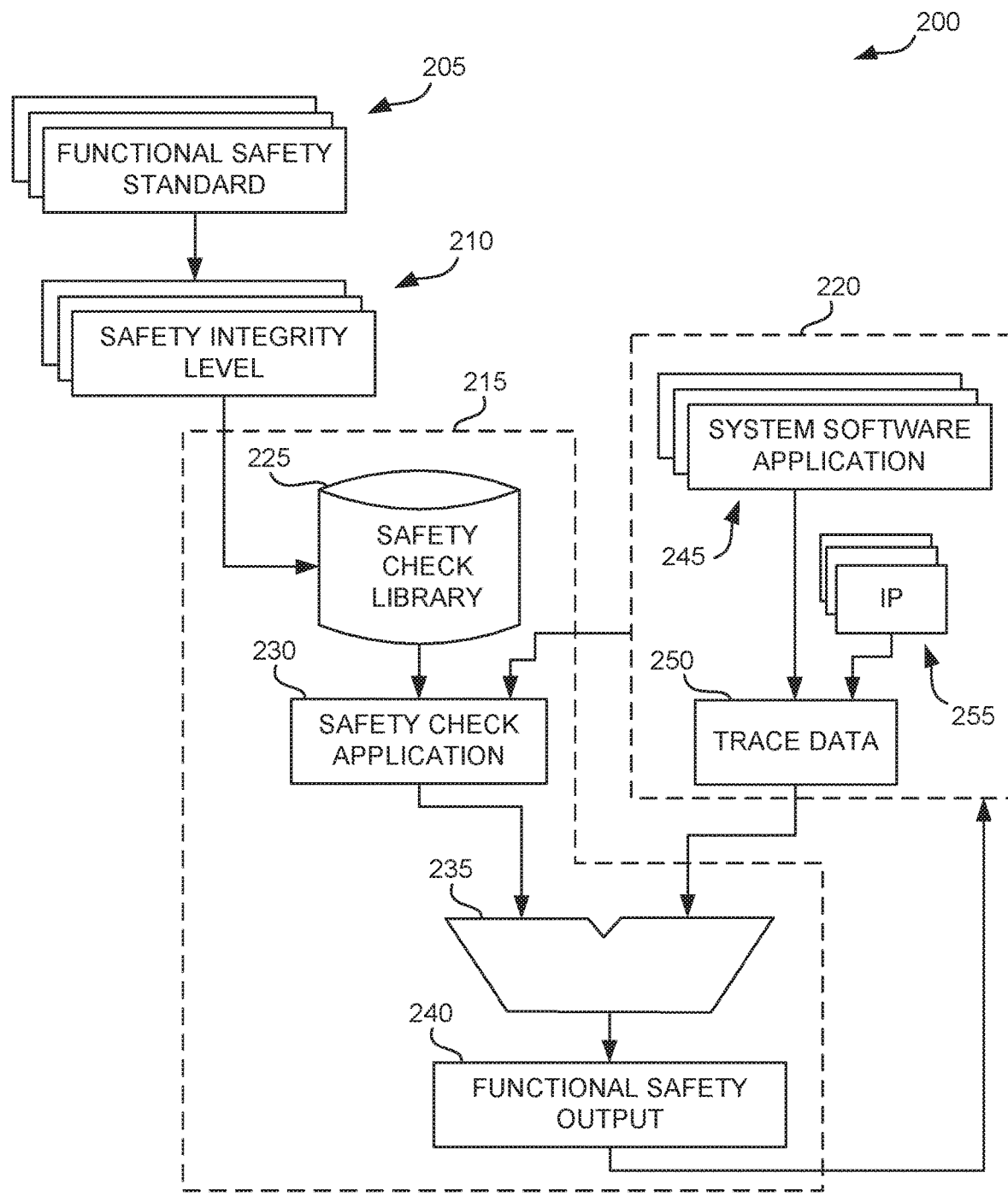
FIG. 2 is a block diagram illustrating components of a system incorporating a tracing infrastructure for functional safety over trace and debug, according to an embodiment.

FIG. 2 is a block diagram illustrating components of a system 200 incorporating a tracing infrastructure for functional safety over trace and debug, according to an embodiment. The system 200 can include an implementation of the system 100. In some embodiments, the system 200 is configured to operate according to one or more functional safety standard 205 or one or more safety integrity levels 210. The system 200 can include a safety integrity level island 215, or a controller unit 220.

The functional safety standard 205 can include any functional safety standard for reducing risk in electrical, electronic, and programmable systems. In some examples, the functional safety standard 205 can define one or more SILs 210 based on analysis of system functions performed by the system 200 or the potential hazards or risks that can rise, such as due to unexpected changes in inputs or operating environment, during the performance of such system functions.

The safety integrity level island 215 can include an implementation of the SILI 150 (FIG. 1), and can include a safety check library 225, safety check software application 230, an execution unit 235, and functional safety output 240.

The safety check library 235 can include one or more safety functions, or algorithms, that are prescribed by a specified SIL 210 of the system 200. Such algorithms or safety functions can use safety-related trace data to check or evaluate whether the operation of the system 200 is in accordance with the specified SIL. The safety functions included in the safety check library 235 can be flexibly formulated or developed, such as to enable the safety check library to be useful in applications that operate with different safety integrity levels or have disparate amounts of computing resources. Such flexibility can include implementing the safety functions using algorithms that are formulated at different complexity or abstraction levels. In an embodiment, the checking or evaluation functionality of a safety function includes evaluating a signal value or analyzing a signature data. In another embodiment, such checking or evaluation functionality include more complicated operations, such as performing property model checks for complex data flows or performing abstract or high-level data semantic evaluation.

The software check library, or the safety functions included therein, can implement one or more types of check or evaluation functionally. In an embodiment, such check or evaluation functionality include safety goal checks, such as designated by a specified SIL. In an example scenario, an automobile is configured with one or more cabin device that generate an audio chime to report a warning or danger message to a driver. In this scenario, the specified SIL can prescribe a safety goal which requires that the audio chime be correctly reported to the driver. The safety check library 225, or a specific safety function, can check this safety goal using algorithms that process safety-related traces captured along the audio chime signal path from a processing unit or IP element in a control unit (e.g., such as the control unit 105) to an actuator driving interface to confirm that, at the device level, the audio chime signal is generated and propagated as expected.

In another embodiment, such check or evaluation functionality includes startup diagnostic checks, such as checks to determine whether an SoC device or an IP element of the SoC device has latent defects. In an example scenario, such startup diagnostic checks include a functional safety related built in self-test (BIST) mechanism for the SoC device or a constituent IP element. In this scenario, a control or predetermined stimuli can be generated and provided to the SoC device or constituent IP element, and associated trace data can be collected and provided to the safety check library 225 or a safety function, where the trace data can be checked against expected values.

In another embodiment, such check or evaluation functionality includes periodic or continuous diagnostic checks for an SoC or a constituent IP element. In an example scenario, such periodic or continuous diagnostic checks include a protocol check for a system interconnect. In this scenario, hardware traces are captured at an interface to the system interconnect and filtered to identify data that is related to an aspect of a protocol used to interface with the system interconnect. The safety check library 225 or a safety function can use the identified data to check the operation of one or more aspect of the protocol interface.

In another embodiment, such check or evaluation functionality includes software activity synchronization checks, such as for fault-tolerant systems that incorporate redundant processing hardware. In an example scenario, such software activity synchronization checks include an implementation of a loosely coupled lock step fault-tolerant system where two or more instances of a software application are executed on two or more redundant processing cores. Each redundant processing core is expected to generate comparable trace data at specified observation points. The safety check library 225 or a safety function can compare the trace data captured in each core against parameters designated for using in checking the synchronization of the cores. The use of trace data in this lock step system enables a software to synchronously run on each core while using only a nominal amount of instrumentation to support the synchronization checks.

In another embodiment, such check or evaluation functionality includes safety-goal independent advanced diagnostic and checking techniques for proving the dependability of a device or system. Such diagnostic and checking techniques can use machine learning for anomaly detection and monitoring.

In another embodiment, such check or evaluation functionality is configured to evaluate other aspects associated with the dependability of a device or system, such as security.

The safety check application 230 can implement one or more selected safety functions or algorithms included in the safety check library 225. Such safety related functions can be selected based a specified SIL of the system 200 or specific system functions performed by the system or control unit thereof. The safety check application 230 can be executed by the processing unit 235 to evaluate the selected safety functions based on safety-related traces received from the system or control unit. The processing unit 235 can generate a functional safety output 240 in response to executing the safety check application 230. The functional safety output 240 can be an output of an individual safety function or an accumulated output of two or more safety functions. The functional safety output 240 can include a notification or a control output, as described herein. In some embodiments, the functional safety output 240 can be provide as feedback to the control unit 220.

The control unit 220 can be an example of the control unit 105 and can incorporate one or more of the components thereof. The control unit 220 can include system software application 245, one or more IP elements 255, and trace data 250. The IP elements 255 can include any of the hardware elements of the controller 105. The system software application 245 can be any industry or user defined software application that is configured to execute on, or to utilize, the IP elements 255. In some embodiments, the system software application 245 can be instrumented with one or more trace operations to provide software state or variable data to the hardware trace infrastructure of the system 200.

Figure 3:
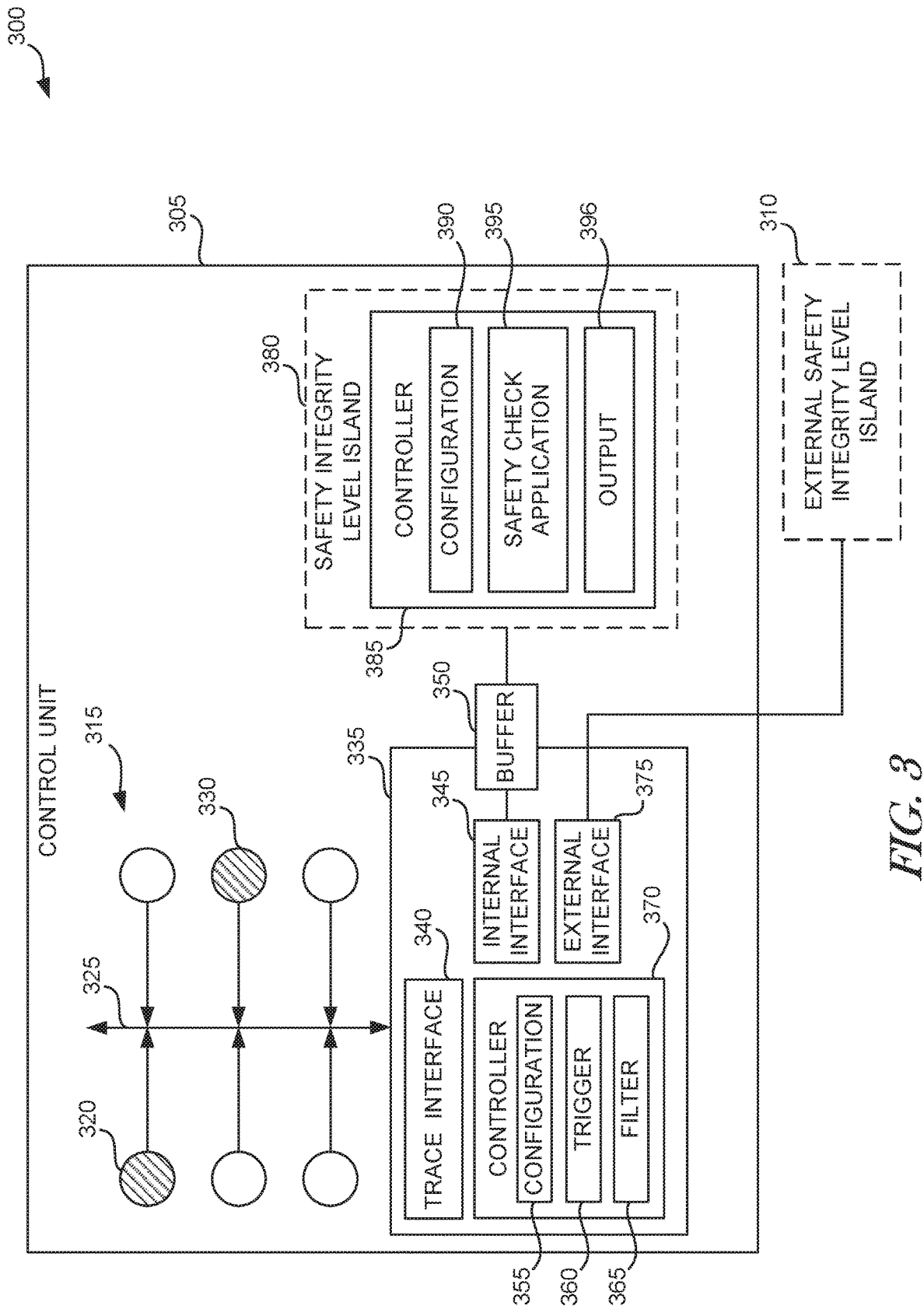
FIG. 3 is a block diagram illustrating components of a tracing infrastructure for functional safety over trace and debug, according to an embodiment.

FIG. 3 is a block diagram illustrating components of a tracing infrastructure 300 for functional safety over trace and debug, according to an embodiment. The tracing infrastructure 300 can include an example of an implementation of one or more aspects of the system 100 (FIG. 1) or the system 200 (FIG. 2). The tracing infrastructure 300 can include one or more trace points 315, a trace interconnect 325, trace management controller 335, internal safety integrity level island 380, or external safety integrity level island 310.

Trace points 315 (e.g., hardware, firmware, or software trace points) can be an example of a trace points 160 (FIG. 1) and can be coupled to the TMC 335 through trace interconnect 325. Such trace points 315 can be coupled to interfaces between one or more IP elements (e.g., IP elements 255, as shown in FIG. 2) and the system interconnect of the control unit 305, and can be configured to capture data that cross these interfaces or internal IP signals. In an embodiment, IP element interface protocols (e.g., IP block interface protocols) that are used to communicate data across these interfaces can be configured to label a such data as functional safety related. In these embodiments, the tracing infrastructure 300 can be configured, such as with one or more filtering profiles, to identify such labels and capture specific functional safety data that cross these interfaces.

In some embodiments, the trace points 315 include one or more trace points 320 or 330 that are designated (e.g., by a manufacture or IP element provide) as relevant to functional safety. Such safety strategic trace points 320, 330 can be configured to capture data that is useful for evaluating a safety check goal, semantic property checks, or safety function supported by a safety check library. Tracing on these safety strategic trace points 320, 330 can enable the capture of specific safety-related traces.

The tracing infrastructure 300 can use filtering profiles or the designation of select trace points as safety strategic trace points to filter trace data that is transmitted on the trace interconnect 325. In an embodiment, the tracing infrastructure 300 can be configured to filter trace data by allowing only data captured by selected hardware trace points (e.g., safety strategic trace points 320, 330) to be communicated along the trace interconnect 325. In another embodiment, the tracing infrastructure 300 can be configured to filter trace data to by allowing safety related only trace data to be communicated along the trace interconnect 325.

The tracing infrastructure 300 can be re-configured by software to adapt the infrastructure to different application profiles or use case of the controller unit 305. In an embodiment, the tracing infrastructure 300 can be configured to support system debug and functional safety. In these embodiments, the tracing infrastructure 300 can be reconfigured, such as by a software application, to adjust the amount of trace interconnect bandwidth consumed safety related trace data, such as to ensure that the tracing infrastructure maintains enough bandwidth to support both debug and functional safety operations. In an embodiment, such reconfiguration can include using software to change the set of hardware trace points that are designated as safety strategic trace points. In another embodiments, such reconfiguration can include changing or adjusting the filtering profiles and or filtering techniques used to determine the type of trace data that is captured at trace points 315 or communicated to the trace interconnect 325. Such reconfiguration can result in power consumption reduction and trace bandwidth optimization across different use cases.

The tracing infrastructure 300 can incorporate one or more security features to protect the tracing infrastructure, trace data, and configuration software from unauthorized access. In an embodiment, such security features include circuits or techniques to disconnect or decouple hardware trace circuits or the SIL 380 or 310 from any external control and observation mechanisms. In another embodiment, the tracing infrastructure 300 can be configured with other security features, such as one or more encryption or authentication mechanisms.

The trace management controller 335 can include one or more circuit or software elements that are configured to receive trace data from a trace points and transmit such data to one or more processing circuits or computing devices for processing or evaluation, as described herein. The TMC 335 can include a trace interconnect interface 340, a controller 370, internal SILI interface 345, external SILI interface 375, and a buffer 350. The trace interconnect interface 340, internal SILI interface 345, or external SILI interface 375 can include circuits, software applications, or communication protocols for communicating trace data or configuration information between the TMC 335, the trace interconnect 325, the internal SIL 380, or the external SILI 310. In an embodiment, trace data communicated between the TMC 335 and the internal SIL 380 can be buffered by the buffer 350.

The controller 370 can include circuits or software applications to enable the TMC 335 to perform the trace data gathering operations of the tracing infrastructure 300. The controller 370 can include configuration element 355, trigger element 360, or filter element 365. In an embodiment, one or more elements of the controller 370 can be included in the trace points 315.

The configuration element 355 can include information or operations that prescribe or control the type trace data that is captured by the trace infrastructure 300, collected by the by the TMC 335, or distributed to the internal SIL 380 or the external SIL 310. In an embodiment, the configuration element 355 can include information or operations to designate one or more hardware trace points 320 or 330 as safety strategic trace points. In another embodiments, the configuration element 355 can include information or operations to enable the trace points 315 to filter trace data, as described herein.

The trigger element 360 can include configuration information or one or more circuits or operations to cause the tracing infrastructure 300 to initiate trace data capture. In an embodiment, the trigger element 360 can cause the tracing infrastructure 300 to capture trace data and execute safety checks on demand, such as in real time in response to an event. Such events can include a power-on event, such as when the control unit 305 is powered on or off during key-on/key-off tests for latent faults. Such events can include application events generated in real time during the execution of a system application by the control unit 305. In another embodiment, the trigger element 360 can cause the tracing infrastructure 300 to capture trace data and execute safety checks periodically. In another embodiment, the trigger element 360 can enable the tracing infrastructure 300 to be clock gated or switched off during the execution of specified parts of a system application.

The filter element 360 can include configuration information, such as one or more filters, or one or more circuits or operations to cause the tracing infrastructure 300 to filter trace data captured at the trace points 315, as described herein.

The SILI 380 can include a processing element that is configured to execute one or more software applications (e.g., a safety check application 230, as show in FIG. 2) that perform safety checks or evaluate safety functions that determine whether operation of a system (e.g., the system 100 or the system 200) that incorporates the control unit 305 in accordance with a specified SIL, as described herein. In an embodiment, the SILI 380 is an IP element of the control unit 305 with specific controlled interfaces, such as interfaces to the TMC 335 or specified circuits that are configured to receive reporting or control signals from the SILI 380.

The SILI 380 can include a controller 385 incorporating configuration information 390, safety check application 395, and output element 396. The configuration information 390 can include any information that is useful for configuring the SILI 380 to interface with the tracing infrastructure 300. Such configuration information can include information associated with communication protocols, security and authentication mechanisms, filtering techniques, application profiles, or the implementation of a specified functional safety standard. The safety check application 395 can be an implementation of the safety check application 230, as described in the discussion of FIG. 2. The output element 396 can include any circuits or operations that are useful to implement or support one or more of the SILI outputs 240 as described in the discussion of FIG. 2.

In some embodiments the SILI 380 can be implemented in a device or system 310 that is external to the control unit 305. Such a device or system can be coupled to the TMC 335 through a hardware trace interface, a debug interface, or another communication port.

FIGS. 4A-4C depict example scenarios for triggering hardware trace collection or functional safety checks in any of the systems described herein.

FIG. 4A depicts a timing diagram for trigging the trace collection based on an occurrence of an event, according to an embodiment. As shown in FIG. 4A, hardware trace collection can be triggered on-demand in response to a triggering event, such as a software application (e.g., a system application event occurring at time 405 or 415). As discussed herein, a triggering event can include a software application (e.g., a system application) event, receipt of a specified input by a system, or any other specified occurrence. Trace data collection can continue for a specified time period 410 or for any time other time period, such as a time period associated with the triggering event. In an embodiments, the initiation of trace data collection can trigger the execution of a software safety check, such as after sufficient trace data is captured to evaluate a safety function.

FIG. 4B depicts a timing diagram for periodically trigging the trace collection, according to an embodiment. As shown in FIG. 4B, hardware trace collection, or a software safety check, can be triggered periodically at specified intervals 420 and 425, such as determined by one or more timer circuits associated with a system, such as the system 100 or the system 200.

FIG. 4C depicts a timing diagram for triggering the trace collection based on an occurrence of a startup event, according to an embodiment. Such hardware trace collection can initiate a built-in self-test when the system 100 or the system 200 is powered on.

Figure 5:
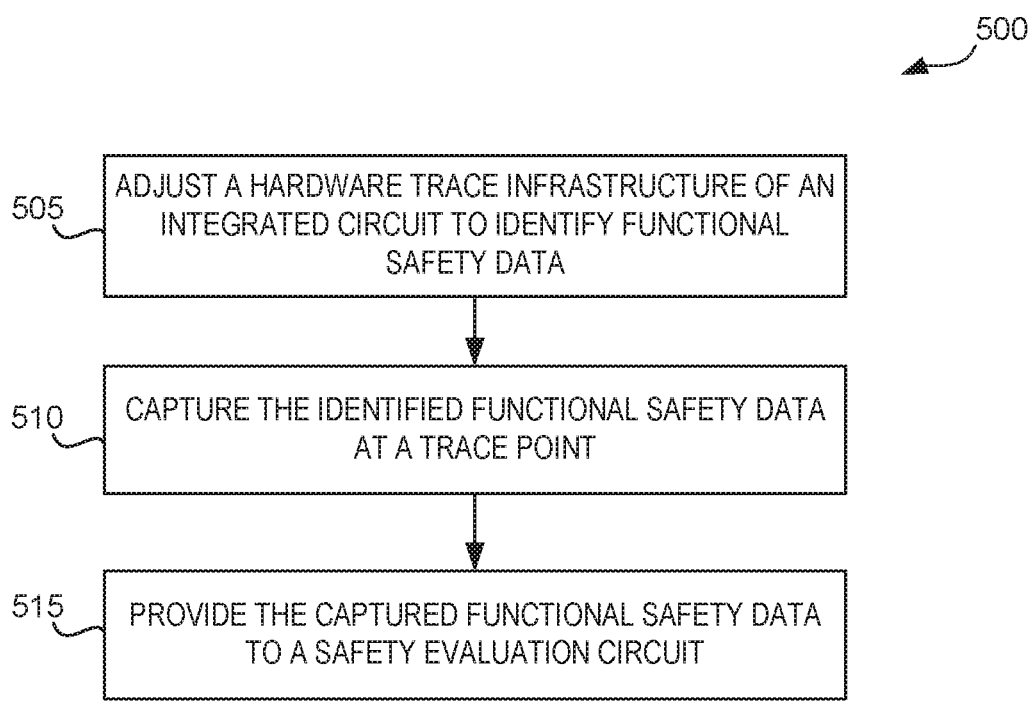
FIG. 5 is diagram illustrating a process that is useful for determine the functional safety of a system that is actuated by an integrated circuit, according to an embodiment.

FIG. 5 is diagram illustrating a process 500 that is useful for determining the functional safety of a system that is actuated by an integrated circuit, according to an embodiment. The process 500 can be executed by a software application executing one or more of the controllers describe herein to evaluate the functional safety of a system, such as the system 100 or the system 200.

At 505, hardware trace infrastructure of an integrated circuit can be adjusted to cause the trace infrastructure to identify functional safety data. Such functional safety data can include data communicated over an interface to an element of the integrated circuit and may include data that is useful to determine whether operation of the integrated circuit indicates that the system can safely perform a specified system function. In some embodiments, adjusting the hardware trace infrastructure of the integrated circuit includes programmatically (e.g., through execution of a software application) configuring one or more trace points (e.g., safety strategic trace points) associated with the hardware trace infrastructure to capture identified functional safety data.

At 510, functional safety data identified by the adjusted hardware trace infrastructure can be captured at a trace point. Such functional safety data can be captured periodically, on-demand, or in real time. In an example, such trace data can be captured during execution of a software application by the integrated circuit without inhibiting the execution or operation of the system incorporating the integrated circuit.

At 515, the captured functional safety data can be provided to an evaluation circuit, such as the safety integrity level island 150 (FIG. 1), 380 (FIG. 3), or 310. In an embodiment, the evaluation circuit is configured to execute one or more operations (e.g., safety functions incorporated into a safety check application) to determine whether the system can safely perform the specified system function. In an embodiment, the system can safely perform a specified system function when operation of the system to perform the system function satisfies requirements or criteria of a SIL associated with the system. In response to determining whether the system can safely perform the specified system function, the evaluation circuit can execute one or more operations to provide an indication of the determination, inhibit operation of the system, or enable operation of the system, as described herein.

In an embodiment, the process 500 can include filtering the functional safety data based on at least of a profile of a system function performed by the system, a safety integrity level of the system, or a bandwidth of a trace interconnect of the hardware trace infrastructure. In another embodiment, the process 500 can include any other operation to perform or implement the techniques described herein.

Figure 6:
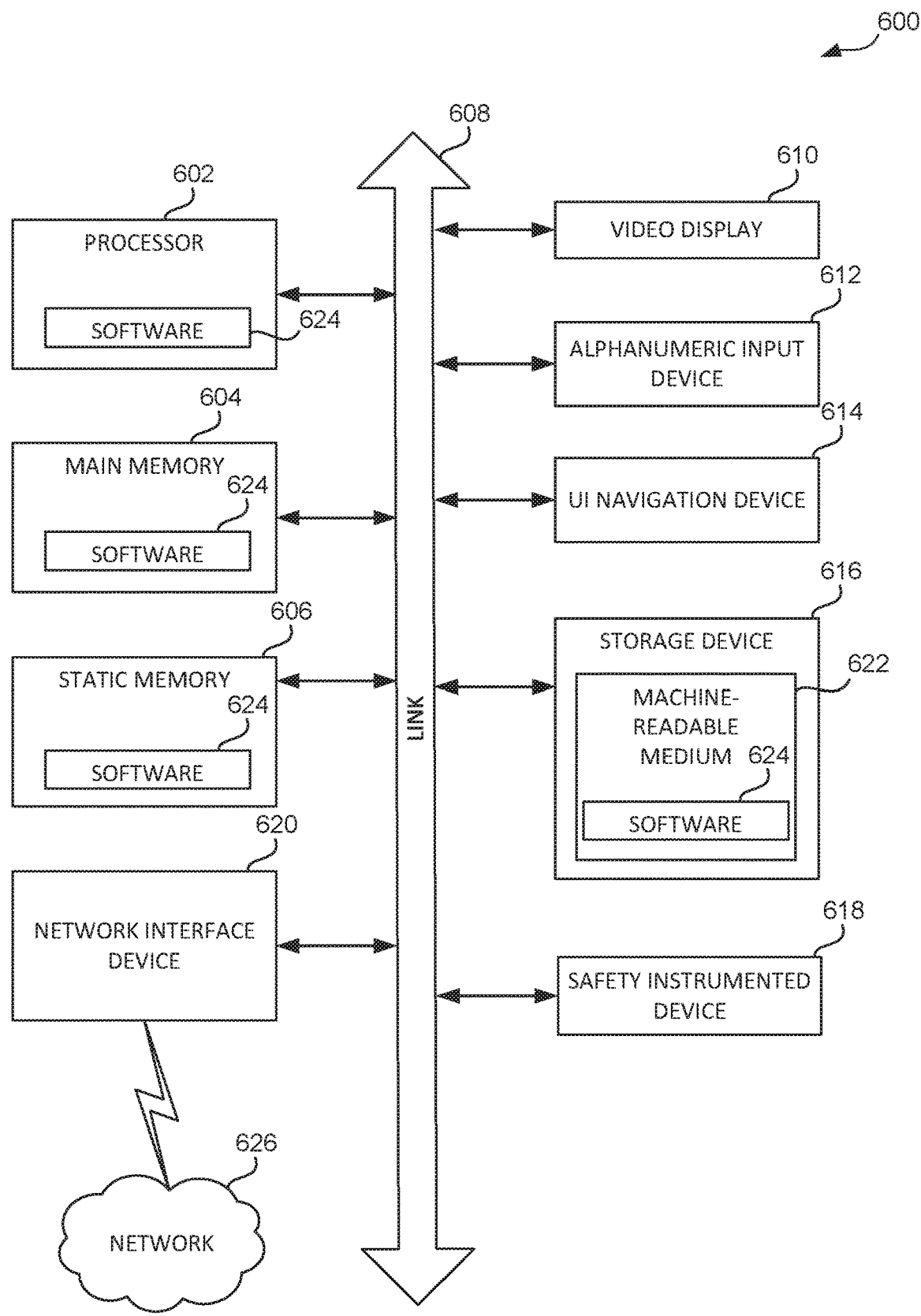
FIG. 6 is a block diagram illustrating an example machine upon which any one or more of the techniques (e.g., methodologies) discussed herein may perform, according to an embodiment.

FIG. 6 is a block diagram illustrating a machine in the example form of a computer system 600, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a vehicle subsystem, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a safety instrumented device 618 (e.g., a control unit 105, a network interface device 620, and one or more sensors (not shown), such as a global positioning system (GPS) sensor, compass, accelerometer, gyrometer, magnetometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a SoC architecture.

ADDITIONAL NOTES & EXAMPLES

Example 1 is a system to evaluate functional safety in an integrated circuit, the system comprising: a first circuit to execute an operation to cause to system to perform a function, the function associated with a specified safety integrity level; and second circuit to: capture trace data at an interface to the first circuit or at internal signals without inhibiting performance of the function, the trace data comprising information that is used to determine whether the system can perform the function with an indicated level of functional safety, and transmit the trace data to a safety evaluation circuit.

In Example 2, the subject matter of Example 1 includes, the safety evaluation circuit, the safety evaluation circuit comprising: a memory to store at least one computer executable instruction to specify a safety criteria to determine whether the system can perform the function with the indicated level of functional safety; and an execution unit to use the trace data to evaluate the safety criteria to determine whether the system can perform the function with the indicated level of functional safety.

In Example 3, the subject matter of Example 2 includes, wherein the safety evaluation circuit is configured to determine whether the first circuit can perform the function with the indicated level of functional safety using an indicated set of operations that are configured to generate predetermined trace data.

In Example 4, the subject matter of Examples 2-3 includes, wherein the at least one computer executable instruction is selected from a database of computer executable instruction for evaluating functional safety of electronic circuits.

In Example 5, the subject matter of Examples 1-4 includes, an integrated circuit comprising: the first circuit; the second circuit; and the safety evaluation circuit.

In Example 6, the subject matter of Examples 1-5 includes, wherein the safety evaluation circuit is packaged in a first integrated circuit and the first circuit and the second circuit are packaged in a second integrated circuit, the first and second integrated circuit separate and distinct from one another.

In Example 7, the subject matter of Examples 1-6 includes, wherein: the first circuit is further to label the trace data to indicate that the trace data comprises information that useful to determine whether the first circuit can perform the function with the indicated level of functional safety; and the second circuit is further to filter the trace data based on the label.

In Example 8, the subject matter of Examples 1-7 includes, wherein the interface to the first circuit comprises a plurality of interfaces, and second circuit is configurable to select an interface from the plurality interfaces from which to the capture trace data based on: the function performed by the first circuit, safety criteria to determine whether the system can perform the function with the indicated level of functional safety, or the indicated level of functional safety.

In Example 9, the subject matter of Examples 1-8 includes, wherein the second circuit is further configured to periodically capture the trace data.

In Example 10, the subject matter of Examples 1-9 includes, wherein the second circuit is configured to capture the trace data in response to an occurrence of an event associated with operation of the system.

In Example 11, the subject matter of Examples 1-10 includes, wherein: the first circuit is configured to perform the function based on operations of a software application; and the trace data received comprises at least one of: data selected by the software application, digital signatures associated with the software application, data indicative of operations executed by the first circuit, unprocessed data captured at the interface on the first circuit, or a timestamp.

In Example 12, the subject matter of Examples 1-11 includes, a security feature to protect the second circuit or the evaluation circuit from unauthorized access.

Example 13 is a method to determine the functional safety of a system that is actuated by an integrated circuit, the method comprising: adjusting a hardware trace infrastructure of the integrated circuit to identify functional safety data in data communicated over an interface to an element of the integrated circuit or its internal signals, the functional safety data comprising data that is useful to determine whether operation of the integrated circuit indicates that the system can safely perform a specified function; capturing the functional safety data at one or more trace point of the hardware trace infrastructure; and providing the captured functional safety data to an evaluation circuit, the evaluation circuit to execute one or more operations for determining whether the system can safely perform the specified function.

In Example 14, the subject matter of Example 13 includes, wherein adjusting the hardware trace infrastructure of the integrated circuit comprises programmatically configuring the one or more hardware trace points to capture the identified functional safety data.

In Example 15, the subject matter of Examples 13-14 includes, filtering the functional safety data based on at least one of a profile of the specified function, a safety integrity level of the system, or a bandwidth of an interconnect fabric of the hardware trace infrastructure.

In Example 16, the subject matter of Examples 13-15 includes, wherein, in response to determining whether the system can safely perform the specified function, the evaluation circuit is further to execute one or more operations for: providing an indication of whether the system can safely perform the specified function, inhibiting operation of the system, or enabling operation of the system.

In Example 17, the subject matter of Examples 13-16 includes, capturing the functional safety data comprises capturing the functional safety data during operation of the electronic circuit without inhibiting performance of the specified function.

In Example 18, the subject matter of Examples 13-17 includes, capturing the filtered trace data at the evaluation circuit periodically or in response to an event.

In Example 19, the subject matter of Examples 13-18 includes, wherein receiving the trace data comprises receiving trace data comprising at least one of: data indicative of a state of a software application executed by the integrated circuit, digital signatures associated with the software application, data indicative of operations executed by the integrated circuit, unprocessed data captured at an interface on the integrated circuit, or a timestamp.

Example 20 is at least one machine-readable medium including instructions for determine the functional safety of a system that is actuated by an integrated circuit, the instructions when executed by a machine, cause the machine to perform the operations comprising: receiving trace data comprising functional safety information that is used to determine whether the system can perform a function with a specified level of functional safety; determining, using the received trace data, whether the system can perform the specified function with a specified level of functional safety; and adjusting operation of the system based in response to the determination.

In Example 21, the subject matter of Example 20 includes, wherein adjusting operation of the system based in response to the determination comprises: providing an indication of whether the system can safely perform the specified function, inhibiting operation of the system, or enabling operation of the system.

In Example 22, the subject matter of Examples 20-21 includes, wherein the trace data is received from a hardware trace infrastructure of the integrated circuit.

In Example 23, the subject matter of Examples 20-22 includes, wherein the operations further comprise adjusting the hardware trace infrastructure of the integrated circuit by programmatically configuring the one or more hardware trace points to capture the trace data.

In Example 24, the subject matter of Example 23 includes, wherein the adjusting further comprise causing the hardware trace infrastructure to capture the trace data periodically or in response to an event.

In Example 25, the subject matter of Examples 20-24 includes, wherein the trace data is received a software application executing on the integrated circuit.

Example 26 is at least one machine-readable medium including instructions that, when executed by processing circuitry, cause the processing circuitry to perform operations to implement of any of Examples 1-25.

Example 27 is an apparatus comprising means to implement of any of Examples 1-25.

Example 28 is a system to implement of any of Examples 1-25.

Example 29 is a method to implement of any of Examples 1-25.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system to evaluate functional safety in an integrated circuit, the system comprising:
    a first circuit to:
        execute an operation to cause to system to perform a function, the function associated with a an indicated level of functional safety,
        generate, responsive to executing the operation, trace data that comprising a label that is indicative of information in the trace data that is useful to determine whether the first circuit can perform the function at the indicated level of functional safety; and
    second circuit to:
        capture the trace data at an interface to the first circuit or at internal signals without inhibiting performance of the function,
        filter the trace data based on the label to produce filtered trace data, and
        transmit the filtered trace data to a safety evaluation circuit.

2. The system of claim 1, further comprising the safety evaluation circuit, the safety evaluation circuit comprising:
    a memory to store at least one computer executable instruction to specify a safety criteria to determine whether the system can perform the function with the indicated level of functional safety; and
    an execution unit to use the trace data to evaluate the safety criteria to determine whether the system can perform the function with the indicated level of functional safety.

3. The system of claim 2, wherein the safety evaluation circuit is configured to determine whether the first circuit can perform the function with the indicated level of functional safety using an indicated set of operations that are configured to generate predetermined trace data.

4. The system of claim 2, wherein the at least one computer executable instruction is selected from a database of computer executable instruction for evaluating functional safety of electronic circuits.

5. The system of claim 1, wherein the first circuit, the second circuit, and the safety evaluation circuit are incorporated in an integrated circuit.

6. The system of claim 1, wherein the safety evaluation circuit is packaged in a first integrated circuit and the first circuit and the second circuit are packaged in a second integrated circuit, the first and second integrated circuit separate and distinct from one another.

7. The system of claim 1, wherein:
    the second circuit is further to filter the trace data based on the label by selectively transmitting the trace data to the safety evaluation circuit based on the label.

8. The system of claim 1, wherein the interface to the first circuit comprises a plurality of interfaces, and second circuit is configurable to select an interface from the plurality interfaces from which to the capture trace data based on:
    the function performed by the first circuit,
    safety criteria to determine whether the system can perform the function with the indicated level of functional safety, or
    the indicated level of functional safety.

9. The system of claim 1, wherein the second circuit is further configured to periodically capture the trace data.

10. The system of claim 1, wherein the second circuit is configured to capture the trace data in response to an occurrence of an event associated with operation of the system.

11. The system of claim 1, wherein:
the first circuit is configured to perform the function based on operations of a software application; and
the trace data received comprises at least one of:
data selected by the software application,
digital signatures associated with the software application,
data indicative of operations executed by the first circuit,
unprocessed data captured at the interface on the first circuit, or
a timestamp.

12. The system of claim 1, further comprising a security feature to protect the second circuit or the evaluation circuit from unauthorized access.

13. A method to determine the functional safety of a system that is actuated by an integrated circuit, the method comprising:
adjusting a hardware trace infrastructure of the integrated circuit to identify functional safety data in data communicated over an interface to an element of the integrated circuit or its internal signals, by labeling data communicated over the interface to indicate that the communicated data comprises data that is useful to determine whether operation of the integrated circuit indicates that the system can safely perform a specified function;
capturing, based on the label, the functional safety data at one or more trace point of the hardware trace infrastructure; and
providing the captured functional safety data to an evaluation circuit, the evaluation circuit to execute one or more operations for determining whether the system can safely perform the specified function.

14. The method of claim 13, wherein adjusting the hardware trace infrastructure of the integrated circuit comprises programmatically configuring the one or more hardware trace points to capture the identified functional safety data.

15. The method of claim 13, further comprising filtering the functional safety data based on at least one of a profile of the specified function, a safety integrity level of the system, or a bandwidth of an interconnect fabric of the hardware trace infrastructure.

16. The method of claim 13, wherein, in response to determining whether the system can safely perform the specified function, the evaluation circuit is further to execute one or more operations for:
providing an indication of whether the system can safely perform the specified function,
inhibiting operation of the system, or
enabling operation of the system.

17. The method of claim 13 capturing the functional safety data comprises capturing the functional safety data during operation of the electronic circuit without inhibiting performance of the specified function.

18. The method of claim 13, further causing the evaluation circuit to capture the functional safety data periodically or in response to an event.

19. The method of claim 13, wherein receiving the trace data comprises receiving trace data comprising at least one of:
data indicative of a state of a software application executed by the integrated circuit,
digital signatures associated with the software application,
data indicative of operations executed by the integrated circuit,
unprocessed data captured at an interface on the integrated circuit, or
a timestamp.

20. At least one non-transitory machine-readable medium including instructions for determine the functional safety of a system that is actuated by an integrated circuit, the instructions when executed by a machine, cause the machine to perform the operations comprising:
receiving trace data comprising functional safety information that is used to determine whether the system can perform a function with a specified level of functional safety;
filtering the trace data based on a specified label to identify labeled trace data that is indicative of specified functional safety information;
determining, using the labeled trace data, whether the system can perform the specified function with a specified level of functional safety; and
adjusting operation of the system based in response to the determination.

21. The at least one non-transitory machine-readable medium of claim 20, wherein adjusting operation of the system based in response to the determination comprises:
providing an indication of whether the system can safely perform the specified function,
inhibiting operation of the system, or
enabling operation of the system.

22. The at least one non-transitory-machine readable medium of claim 20, wherein the trace data is received from a hardware trace infrastructure of the integrated circuit.

23. The at least one non-transitory machine-readable medium of claim 20, wherein the operations further comprise adjusting the hardware trace infrastructure of the integrated circuit by programmatically configuring the one or more hardware trace points to capture the trace data.

24. The at least one non-transitory machine-readable medium of claim 23, wherein the adjusting further comprise causing the hardware trace infrastructure to capture the trace data periodically or in response to an event.

25. The at least one non-transitory machine-readable medium of claim 20, wherein the trace data is received from a software application executing on the integrated circuit.

* * * * *

UNITED STATES PATENT AND TRADEMARK OFFICE
CERTIFICATE OF CORRECTION

| | |
|---|---|
| PATENT NO. | : 10,846,439 B2 |
| APPLICATION NO. | : 16/457748 |
| DATED | : November 24, 2020 |
| INVENTOR(S) | : Locatelli et al. |

It is certified that error appears in the above-identified patent and that said Letters Patent is hereby corrected as shown below:

In the Claims

In Column 20, Line 41, in Claim 22, delete "non-transitory-machine readable" and insert --non-transitory machine-readable-- therefor Signed and Sealed this
Twenty-first Day of December, 2021

Drew Hirshfeld
*Performing the Functions and Duties of the
Under Secretary of Commerce for Intellectual Property and
Director of the United States Patent and Trademark Office*